United States Patent [19]

Lombardi

[11] Patent Number: 4,606,525

[45] Date of Patent: Aug. 19, 1986

[54] HEIGHT ADJUSTMENT OF MUSIC STAND

[76] Inventor: Don Lombardi, c/o Drum Workshop, Inc., 2697 Lavery Ct. Unit 16, Newbury Park, Calif. 91320

[21] Appl. No.: 565,573

[22] Filed: Dec. 27, 1983

[51] Int. Cl.⁴ ............................................. A47B 97/04
[52] U.S. Cl. ..................................... 248/460; 84/421; 206/314; 248/188.5; 248/463; 248/544
[58] Field of Search ............... 248/460, 461, 462, 463, 248/544, 188.5, 411; 84/421; 206/314

[56] References Cited

U.S. PATENT DOCUMENTS

| | | | |
|---|---|---|---|
| 576,327 | 2/1897 | Rockwell | 248/462 |
| 765,187 | 7/1904 | Meyer et al. | 248/461 |
| 794,503 | 7/1905 | Hoffman | 248/461 |
| 1,154,704 | 9/1915 | Leyson | 248/353 |
| 1,286,878 | 12/1918 | Granger | 248/411 |
| 1,795,747 | 3/1931 | Viken | 248/411 |
| 3,637,172 | 1/1972 | Diesbach | 248/460 |
| 3,758,063 | 9/1973 | Lacey | 248/161 |
| 3,866,619 | 2/1975 | Per Frisk | 248/188.5 X |

Primary Examiner—Ramon O. Ramirez
Attorney, Agent, or Firm—William W. Haefliger

[57] ABSTRACT

Height adjustment structure is provided for a music stand having upper and lower telescopic sections, at least one of which is tubular. The structure includes:
 (a) a height limiting flexible strand extending lengthwise within said tubular section or sections,
 (b) the strand having an upper portion attached to an upper one of said sections,
 (c) the strand having a lower portion attached to a lower one of said sections, and
 (d) the length of the strand between said attachments when taut blocking further elevation of the upper section related to the lower section.

5 Claims, 3 Drawing Figures

U.S. Patent    Aug. 19, 1986    4,606,525
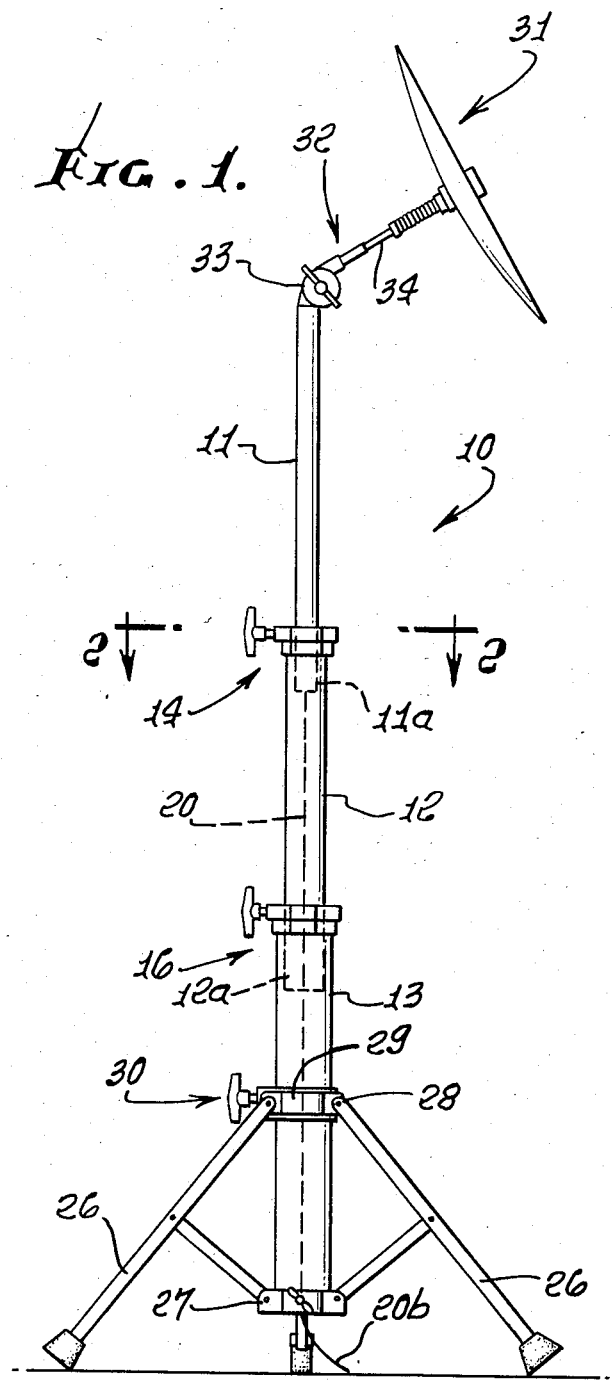
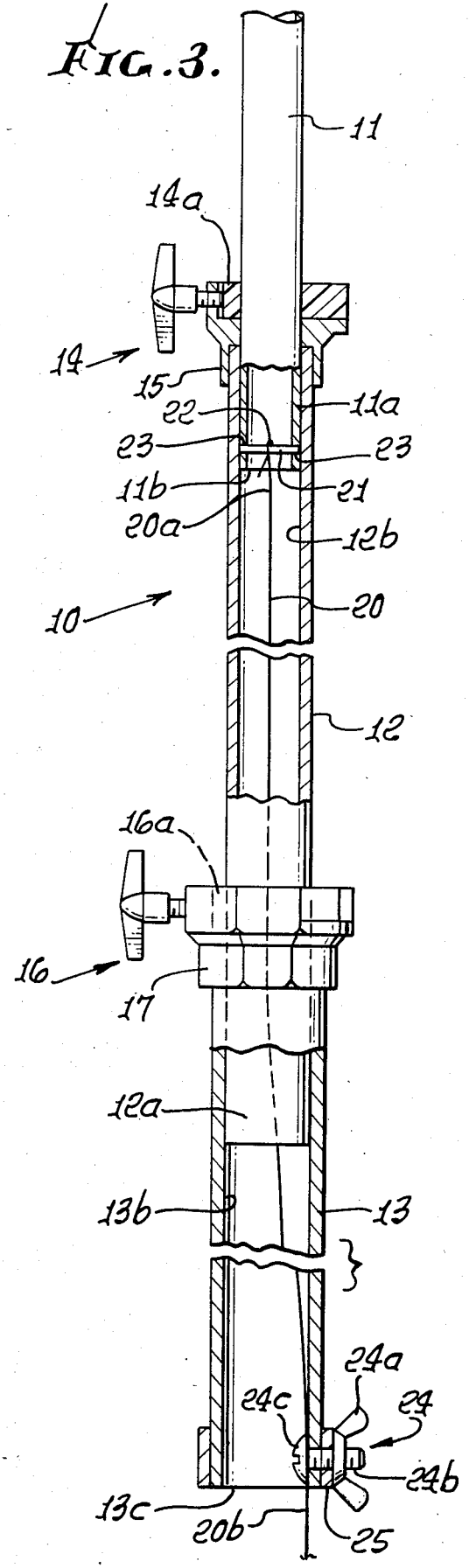
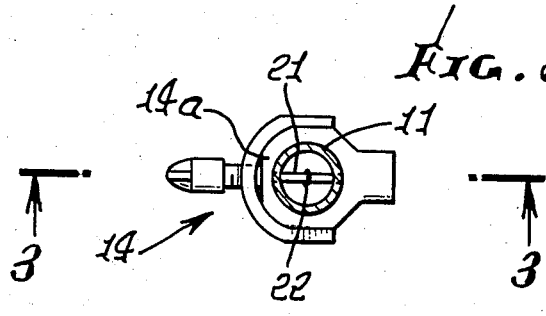

HEIGHT ADJUSTMENT OF MUSIC STAND

BACKGROUND OF THE INVENTION

This invention relates generally to music stands, and more particularly to height adjustment or control of telescoping sections of such stands.

At the present time, musicians must, by trial and error, adjust the multiple sections of their music stands at the time of set-up, and often during a performance if the stand height is not correct. This is a never-ending nuisance, and is time consuming. There is a need to overcome this problem. In the past, external devices on the stand sections assisted height adjustment, but they limited or prevented full telescoping of the sections

SUMMARY OF THE INVENTION

It is a major object of the invention to provide means to overcome the above problems, and in a way which does not alter the outside appearance of the stand structure, nor limit telescoping together of the stand sections. Basically, the height adjustment means for the multiple telescopic sections of a music stand comprises (a) a height limiting flexible strand extending lengthwise within said tubular section or sections, (b) the strand having an upper portion attached to an upper one of said sections, and (c) the stand having a lower portion attached to a lower one of said sections, (d) the length of the strand between said attachments when taut blocking further elevation of the upper section relative to the lower section.

As will appear, the lower section has an open end via which the strand lower end is accessible to adjust strand taut length; a clamp on the lower section may be employed to adjustably clamp the strand at taut length selected by relative initial adjustment of the stand tubular telescopic sections; a transverse pin may be located in the upper tubular section and to which the upper extent of the strand may be connected, and the strand length may be adjusted to accommodate to initial telescopic adjustment of the stand section. Thereafter, when the sections are extended, the strand or string becomes taut at the selected height adjustment of the sections.

These and other objects and advantages of the invention, as well as the details of an illustrative embodiment, will be more fully understood from the following description and drawings, in which:

DRAWING DESCRIPTION

FIG. 1 is an elevation showing a music stand incorporating the invention;

FIG. 2 is an enlarged horizontal section taken on lines 2—2 of FIG. 1; and

FIG. 3 is an enlarged fragmentary elevation showing details of the FIG. 1 music stand.

DETAILED DESCRIPTION

In the drawings, the music stand 10 includes multiple telescoping sections, as for example at 11, 12 and 13. These include upper sections 11 telescopically partly received in tubular middle section, and the middle section telescopically partly recessed within the lower section. See in this regard FIG. 3 showing lower portion 11a of section 11 telescopically received in bore 12b of middle section 12; and lower portion 12a of section 12 telescopically recessed in bore 13b of section 13. A clamp 14 mounted at 15 on the upper end of section 12 is manually operable to clamp a friction ring 14a against the side of section 11; and a clamp 16 mounted at 17 on the upper end of section 13 is manually operable to clamp a similar friction ring 16a against the side of section 12, thereby to retain the sections in the position shown. When the clamps are loosened, the section are relatively telescopically movable as from collapsed position to desired extended position, as manually controlled by the musician when he sets up his equipment. Exact height adjustment of the sections was usually difficult, in the past, and achieved by trial and error.

The invention overcomes these problems, and is embodied in a height limiting flexible strand 20 extending lengthwise within at least one tubular section, for example in both sections 12 and 13 as illustrated. The strand 20 has an upper portion 20a attached to an upper one of the sections, and also a lower portion 20b attached to a lower one of the section. See for example the transverse pin 21 in and near the lower open end 11b of the upper telescopic section, and to which the strand or string is tied at 22. The opposite ends of the pin are connected to the cylindrical wall of section 11, and the knot 22 is accessible via the open end 11b of the section 11 to lengthen or shorten the strand length in the sections, to assist in height adjustment. This can be done when section 11 is removed from section 12, and sections 12 and 13 are combined relatively together. Also, the pin is readily emplaced in section 11 of an existing stand, as by first drilling transverse openings in the section wall, as shown at 23, to tightly fit the pin opposite ends.

The lower end portion 20b of the strand or string is typically adjustably attached to the lower section, as for example by a clamp 24. The latter is shown to include a wing nut 24a on a threaded shank 24b of a fastener having a head 24c. When nut 24a is tightened against washer 25 and on shank 24b, the head 24c is tightened toward bore 13b near the lower open end 13c of section 13, to retain the strand between the head and the hole. The strand length in the sections is initially adjusted, as by loosening the clamp 24, adjusting the sections 11, 12 and 13 to desired stand height, pulling the free end 20b of the strand to cause the strand to become taut, and tightening the clamp 24. Thereafter, the musician may collapse the sections for travel, and when he extends them to set up for playing, the strand will become taut and limit the section extension, automatically, at the desired or correct height of the stand.

FIG. 1 also shows collapsible legs 26 pivotally attached at 27 to the lower section and at 28 to a slide ring 29 on the lower section. A clamp 30 clamps the ring to the section. Also shown, merely for illustration, is a cymbal 31 adjustably attached at 32 to the upper section. See clamp 33 to adjust the angle of cymbal support rod 34.

Note that the strand 20 is protectively confined within the sections, and does not alter the outside appearance of the music stand.

I claim:

1. In height adjustment means for a music stand having upper, middle and lower telescoping sections at least one of which is tubular, and in combination with said stand, the combination comprising (a) a height limiting flexible strand extending lengthwise within said tubular section or sections, (b) the strand having an upper portion attached to an upper one of said sections, and (c) the strand having a lower portion attached to a lower one of said sections,
(d) the length of the strand between said attachments when taut blocking further elevation of the upper section related to the lower section, the length of the strand substantially exceeding the length of each section,
(e) the lower section having an open end via which the lower portion of the strand is accessible to adjust its taut length within the sections,
(f) there being a clamp on the lower section acting to adjustably clamp said lower portion of the strand, adjacent said lower section lower end,
(g) there being a transverse pin in the lower end of the upper section to which the strand upper portion is attached, the lower end of the upper section being open, but received in the middle section, the attachment of the strand to said transverse pin being adjustable via the open lower end of the upper section when the upper section is removed from the middle section.

2. The combination of claim 1 wherein the strand is taut when the upper section remains partly received in the middle section, and a clamp to clamp said upper and middle sections together when the strand is taut, or near taut.

3. The combination of claim 2 including a music implement supported by said sections, and a base on said lower section.

4. The combination of claim 3 wherein the base comprises folding legs.

5. The combination of claim 1 wherein the strand has a lower end portion which protrudes through the lower end of the lower section, to be pulled during strand length adjustment.

* * * * *